(12) United States Patent
Song et al.

(10) Patent No.: US 6,541,162 B1
(45) Date of Patent: Apr. 1, 2003

(54) ELECTROLYTE FOR RECHARGEABLE LITHIUM BATTERY AND RECHARGEABLE LITHIUM BATTERY COMPRISING THE SAME

(75) Inventors: Eui-Hwan Song, Chungcheongnam-do (KR); Sergey V. Sazhin, Chungcheongnam-do (KR); Mikhail Yu Khimchenko, Chungcheongnam-do (KR); Yevgeniy N. Tritenichenko, Chungcheongnam-do (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/466,371

(22) Filed: Dec. 16, 1999

(30) Foreign Application Priority Data

Dec. 18, 1998 (KR) .............................. 98-56337

(51) Int. Cl.$^7$ ................................ H01M 6/16
(52) U.S. Cl. .................. 429/326; 429/324; 429/331; 429/332; 429/338
(58) Field of Search ................. 429/324, 326, 429/331, 332, 338

(56) References Cited

U.S. PATENT DOCUMENTS

| | | | | |
|---|---|---|---|---|
| 5,340,670 A | * | 8/1994 | Takami et al. | 423/445 R |
| 5,522,127 A | * | 6/1996 | Ozaki et al. | 264/105 |
| 5,744,262 A | * | 4/1998 | Cheng et al. | 429/197 |
| 5,773,165 A | * | 6/1998 | Sugeno | 429/197 |

FOREIGN PATENT DOCUMENTS

| | | | | |
|---|---|---|---|---|
| JP | 9-63645 | * | 3/1997 | H01M/10/40 |

* cited by examiner

*Primary Examiner*—Carol Chaney
*Assistant Examiner*—Dah-Wei D. Yuan
(74) *Attorney, Agent, or Firm*—Blakely Sokoloff Taylor & Zafman

(57) ABSTRACT

An electrolyte for a rechargeable lithium battery is provided. The electrolyte includes a non-aqueous organic solvent and a lithium salt. The non aqueous organic solvent includes cyclic carbonate such as ethylene carbonate and propylene carbonate, chain carbonate such as dimethyl carbonate, diethyl carbonate, methyl ethyl carbonate and methyl propyl carbonate, and alkyl acetate such as n-methyl acetate, n-ethyl acetate and n-propyl acetate. The electrolyte can be used in a rechargeable lithium battery to provide good low temperature characteristics and safety.

5 Claims, 5 Drawing Sheets ically used include cyclic carbonate such as propylene carbonate and ethylene carbonate, and chain carbonate such as dimethyl carbonate and diethyl carbonate. Also used as an organic solvent in electrolyte are 1,2-dimethoxyethane, diethoxyethane or a mixture thereof.

ELECTROLYTE FOR RECHARGEABLE LITHIUM BATTERY AND RECHARGEABLE LITHIUM BATTERY COMPRISING THE SAME

CROSS REFERENCE TO RELATED APPLICATION

This application is based on application No. 98-56337 filed in the Korean Industrial Property Office on Dec. 18, 1998, the content of which is incorporated hereinto by reference.

BACKGROUND OF THE INVENTION (a) Field of the Invention

The present invention relates to an electrolyte for a rechargeable lithium battery and a rechargeable lithium battery including the same, and more particularly, to an electrolyte for a rechargeable lithium battery which can improve low temperature and safety characteristics of the battery.

(b) Description of the Related Art

Rechargeable lithium batteries employ materials into or from where lithium ion can be intercalated or deintercalated for positive and negative active materials.

Transition metal oxide based-compounds are primarily used as the positive active material in the rechargeable lithium battery. Typical examples include lithium cobalt oxide ($LiCoO_2$), lithium nickel oxide ($LiNi_{1-x}Co_xO_2$)(x=0 to 0.5) or lithium manganese oxide ($Li_iMn_2O_4$)(i=1.0 to 1.5). Carbon-based materials which can reversibly absorb and desorb lithium ions while maintaining structural and electrical properties, in addition to having the same chemical potential as metal lithium when lithium ion is intercalated and deintercalated, are mainly used as the negative active material. Carbon-based materials can be largely classified into two categories of (a) crystalline carbon such as graphite and (b) low crystalline carbon having pseudo-graphite or turbostratic structures. Low crystalline carbon, or amorphous carbon may also be classified into two categories of soft carbon and hard carbon. Soft carbon is produced by heat-treating coal tar or pitch at about 1000° C. and hard carbon is produced by carbonizing polymer resin. Crystalline carbon has a high true density, thereby increasing packing efficiency. Crystalline carbon has also an improved voltage flatness and good reversible charge and discharge properties. However, crystalline carbon, has a lower charge capacity than low crystalline carbon. In other words, low crystalline carbon has relatively higher charge capacity than crystalline carbon, but possesses the disadvantage of having extremely high irreversible charge and discharge properties.

The type of electrolytes used is critical to battery performance. The electrolytes include lithium salt such as $LiPF_6$ and organic solvents. The organic solvents used in electrolyte must have various properties including less reactivity with lithium; low internal resistance which helps the movement of lithium ions between the positive and negative electrodes; thermal safety in over a wide range of temperatures; good compatibility with other battery components such as the negative and positive electrodes, and in particular with negative active materials; and a high dielectric constant to increase the amount of lithium dissolved. The organic solvents that satisfy these conditions and therefore are typ- Among these materials, propylene carbonate has a good compatibility with amorphous carbon and good low temperature characteristics because it has a low melting point of −49° C. In addition, propylene carbonate can dissolve a large amount of lithium salt because it has high dielectric constant. However, propylene carbonate has various disadvantages such as a high viscosity. Furthermore, when crystalline negative active materials such as graphite are used together with propylene carbonate, propylene carbonate dissolves as it is inserted into between negative active material layers, thereby generating propylene gas and lithium carbonate which cause a decrease in capacity and an increase irreversible capacity during charging. Irreversible capacity is primarily caused by structural characteristics of the carbon-based active material and varies according to a reduction of the electrolyte on a boundary where lithium contacts the carbon, and also according to an electrolyte passive layer formed on the surface of carbon.

On the other hand, ethylene carbonate, also listed above as a commonly used organic solvent, does not react with the graphite negative active material and also has a high dielectric constant such that it is applicable to a battery using the crystalline carbon. However, ethylene carbonate has a high viscosity and a high melting point of about 36° C. such that low temperature characteristics are not obtained.

Furthermore, chain carbonate (aliphatic carbonate) such as dimethyl carbonate (DMC) and diethyl carbonate (DEC), also stated above as a commonly used organic solvent has a low viscosity and is easily intercalated into the carbon layers, decreasing irreversible capacity. In addition, chain carbonate has a low reactivity with lithium. However, because chain carbonate has a low dielectric constant, it can not dissolve a large amount of lithium salt. With regard to DMC in particular, dimethyl carbonate can be used in high current and high voltage batteries because dimethyl carbonate has high dielectric constant, but this material has a high melting point of 4.6° C. such that it has bad low temperature characteristics. Further, regarding organic solvents such as dimethylformamide and acetonitrile although these materials have a high dielectric constant, they have good reactivity with lithium, thereby rendering dimethylformamide and acetonitrile difficult to use as organic solvents.

In order to compensate for the various disadvantages of the organic solvents of the electrolyte solution described above, methods have been disclosed in recent times in which two or more solvents are mixed.

U.S. Pat. No. 5,639,575 discloses an electrolyte including ethylene carbonate/dimethyl carbonate to which diethylene carbonate, having good low temperature characteristics, is added. In this case, when compared with an electrolyte including ethylene carbonate/dimethyl carbonate in which diethylene carbonate is not added, the added version naturally has improved low temperature characteristics, but the difference is not substantial. Furthermore, when this electrolyte is used in a battery, safety problems occur because the electrolyte causes the temperature at which the active material decompose to be low and because the electrolyte causes increases a high quantity of heat when the active material is decomposed.

SUMMARY OF THE INVENTION

It is an object of the present invention to provide an electrolyte for a rechargeable lithium battery having good low temperature and safety characteristics.

It is another object of the present invention to provide a rechargeable lithium battery including the electrolyte.

These and other objects may be achieved by an electrolyte for a rechargeable lithium battery including a non-aqueous solvent and a lithium salt. The non-aqueous solvent includes cyclic carbonate, chain carbonate and alkyl acetate.

The present invention further includes a rechargeable lithium battery having a positive electrode with a transition metal oxide-based active material and a negative electrode with a carbon-based active material. A separator is interposed between the negative and positive electrodes. The positive and negative electrodes and the separator are all saturated with an electrolyte. The electrolyte includes cyclic carbonate, chain carbonate and alkyl acetate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
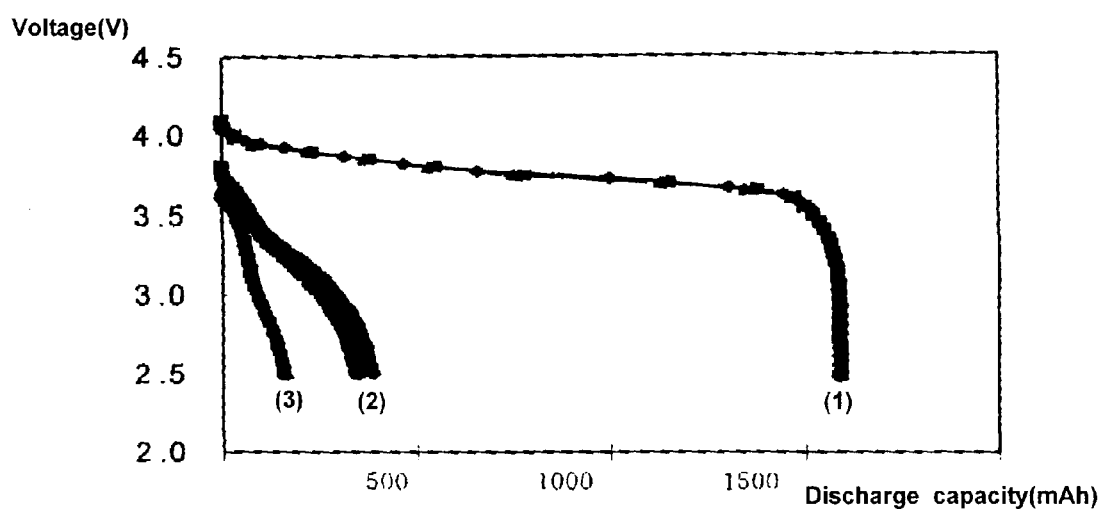
FIG. 1 is a graph showing low temperature characteristics of a battery using conventional electrolyte.

An electrolyte for a rechargeable lithium battery of the present invention includes a non-aqueous organic solvent and a lithium salt. The non-aqueous organic solvent includes 20 to 70 volume % of cyclic carbonate, 20 to 70 volume % of chain carbonate and 5 to 60 volume % of alkyl acetate.

The cyclic carbonate preferably include ethylene carbonate (EC), propylene carbonate (PC) or a mixture thereof. The chain carbonate preferably include dimethyl carbonate, diethyl carbonate, methyl ethyl carboante, methyl propyl carbonate or a mixture thereof.

In the present invention, the electrolyte includes alkyl acetate ($CH_3COOR'$) having a low melting point to improve low temperature characteristics. The alkyl acetate preferably includes n-methyl acetate (MA), n-ethyl acetate (EA), n-propyl acetate (PA) or a mixture thereof, more preferably, n-propyl acetate.

The lithium salt preferably includes lithium hexafluorophosphate ($LiPF_6$), lithium tetrafluoroborate ($LiBF_4$), lithium perchlorate ($LiClO_4$), lithium trifluoromethanesulfonate ($LiCF_3SO_3$) or a mixture thereof.

The electrolyte of the present invention is used for a rechargeable lithium battery provided with a positive electrode, a negative electrode and a separator. In the positive electrode, transition metal is used for an active material and in the negative electrode, carbonaceous material is used for an active material. The separator is interposed between the positive and negative electrodes and acts to fully separate the positive and negative electrodes from each other. The positive and negative electrodes as well as the separator are all saturated with the electrolyte of the present invention.

The carbonaceous material may be globular carbonaceous material or graphite fiber. The globular carbonaceous material is prepared by carbonizing mesophase globular particles and graphitizing the carbonized mesophase globular particles. The graphite fiber is prepared by carbonizing mesophase pitch fiber and graphitizing the carbonized mesophase pitch fiber. The negative active material has a planar distance of $d_{002}$ of 3.35 to 3.38Å of an X-ray diffraction plane distance at a (002) plane, a crystallinity size in a direction of a c axis of Lc of 20 nm and exothermic peaks of at least 700° C. in an exothermic thermal analysis.

The following examples further illustrate the present invention.

Examples 1 to 5 and Comparative Examples 1 to 4

Electrolytes having the composition as shown in Table 1 were produced. Using the electrolytes, 18650 type rechargeable lithium cells were manufactured.

Low temperature characteristics, cycle life at both room temperature and at a high temperature and safety characteristics of the batteries of Examples 1 to 5 and Comparative examples 1 to 4 were measured by the following method. The results are shown in Table 1.

In Table 1, "capacity at low temperature" refers to a capacity during discharging at rate of 0.2 C and at a temperature of −20° C. This measurement is given as a percentage of discharge capacity at room temperature. At this time, $LiNi_{0.8}Co_{0.2}O_2$ was used for the positive active material and mesophase carbon fiber was used for the negative active material.

Further, "cycle life characteristics" refer to capacity after the battery was performed 300th charge and discharge cycles at 1 C. As shown in Table 1, cycle life characteristics was measured at both room temperature (25° C.) and a high temperature (50° C.). The measurements given are percentage of initial capacity. At this time, $LiCoO_2$ was used for the positive active material and mesophase carbon fiber was used for the negative active material.

To determine safety of the batteries, a temperature and a quantity of heat evolved when the active material was decomposed were measured by the differential scanning calorimeter method. After charging the battery to 4.2 V, the electrode was removed from the battery and the differential scanning calorimeter analysis was performed by increasing the temperature to 700° C. at a rate of 3° C./min. At this time, $LiNi_{0.8}Co_{0.2}O_2$ (active material A) manufactured by Fuji Co. or $LiNi_{0.8}Co_{0.15}Al_{0.005}O_2$ (active material B) manufactured by Fuji Co. was used for the positive active material and mesophase carbon fiber was used for the negative active material. $LiNi_{0.8}Co_{0.15}Al_{0.005}O_2$ (active material B) is produced by coating $LiNi_{0.8}Co_{0.2}O_2$ with magnesium alkoxide.

TABLE 1

| | Electrolyte | | Capacity at low temperature | Cycle life Characteristics (300th, 1 C) | | Decomposition temperature [° C.] | | Quantity of heat evolved when the active material was decomposed [J/g] | |
| --- | --- | --- | --- | --- | --- | --- | --- | --- | --- |
| | Organic solvent | Lithium salt | (−20° C., 0.2 C) | 25° C. | 50° C. | Active material A | Active material B | Active material A | Active material B |
| Ex. 1 | EC/DEC/PA (3/3/4) | LiPF$_6$ | 92% | 88% | 83% | 235 | 227 | 400 | 80 |
| Ex. 2 | EC/EMC/PA (3/3/4) | LiPF$_6$ | 90% | 87% | 82% | 233 | 230 | 380 | 90 |
| Ex. 3 | EC/DMC/PA (3/3/4) | LiPF$_6$ | 92% | 88% | 82% | 235 | 229 | 420 | 85 |
| Ex. 4 | EC/DMC/MA (3/3/4) | LiPF$_6$ | 80% | 70% | 68% | 229 | 219 | 510 | 405 |
| Ex. 5 | EC/DMC/EA (3/3/4) | LiPF$_6$ | 88% | 75% | 72% | 233 | 222 | 530 | 510 |
| Com. 1 | EC/DMC (1/1) | LiPF$_6$ | 10–24% | 70% | 65% | 224 | 227 | 780 | 525 |
| Com. 2 | EC/DMC/DEC (5/4/1) | LiPF$_6$ | 42% | 80% | 70% | 229 | 210 | 390 | 720 |
| Com. 3 | EC/DMC/DEC (4/4/1) | LiPF$_6$ | 56% | 74% | 65% | 228 | 213 | 410 | 730 |
| Com. 4 | EC/DMC/DEC (3/3/4) | LiPF$_6$ | 72% | 70% | 65% | 226 | 215 | 440 | 715 |

Figure 2:
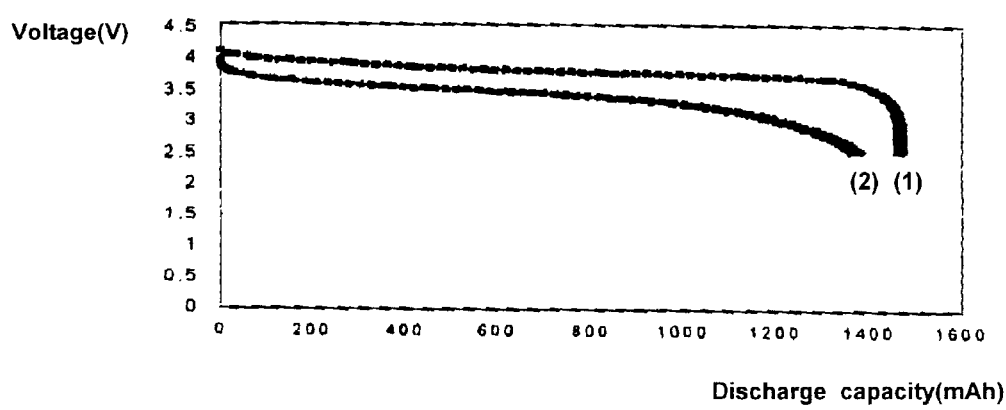
FIG. 2 is a graph showing low temperature characteristics of a battery using an electrolyte according to one embodiment of the present invention.
Figure 3:
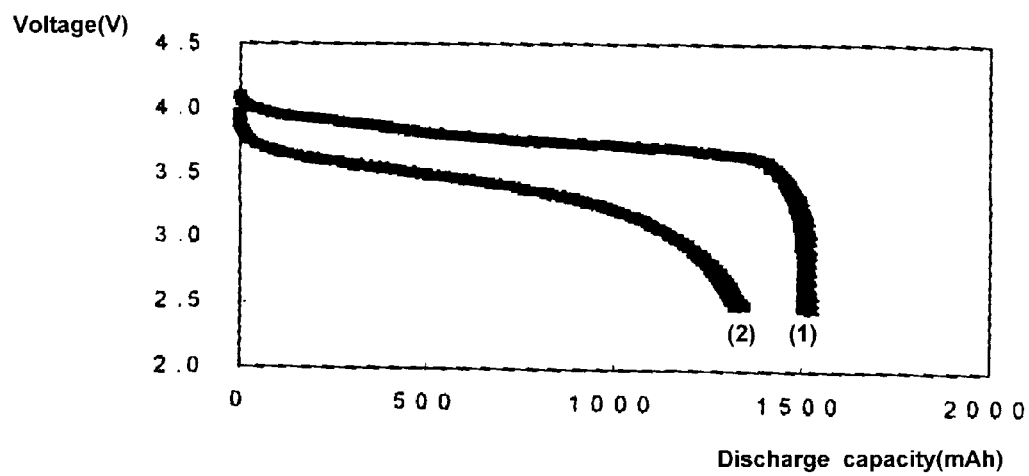
FIG. 3 is a graph showing low temperature characteristics of a battery using an electrolyte according to another embodiment of the present invention.

EC = ethylene carbonate; DEC = dimethyl carbonate; PA = propyl acetate;
EMC = ethyl methyl carbonate; MPC = methyl propyl carbonate
Ex. = Example; Com. = Comparative example As shown in Table 1, the batteries of Examples 1 to 5, which include alkyl acetate, have substantially high capacities at low temperatures than Comparative example 1, which include ethylene carbonate/dimethyl carbonate, and Comparative examples 2 to 4, which include diethylene carbonate to improve low temperature characteristics. In FIG. 1, line 1 shows a discharge capacity at room temperature of the battery of Comparative example 1 and lines 2 and 3 show a discharge capacity at −20° C. thereof. In FIG. 2, line 1 shows a discharge capacity at room temperature of Example 1 and line 2 shows a discharge capacity at −20° C. of Example 1. As shown in FIGS. 1 to 3, the electrolyte of Example 1, which includes alkyl acetate increases the capacity of the battery by 50 to 70% when compared with the electrolyte of Comparative example 1 which includes ethylene carbonate/dimethyl carbonate; and by 20 to 50% when compared with Comparative example 3, which includes ethylene carbonate/dimethyl carbonate/diethyl carbonate.

Figure 4:
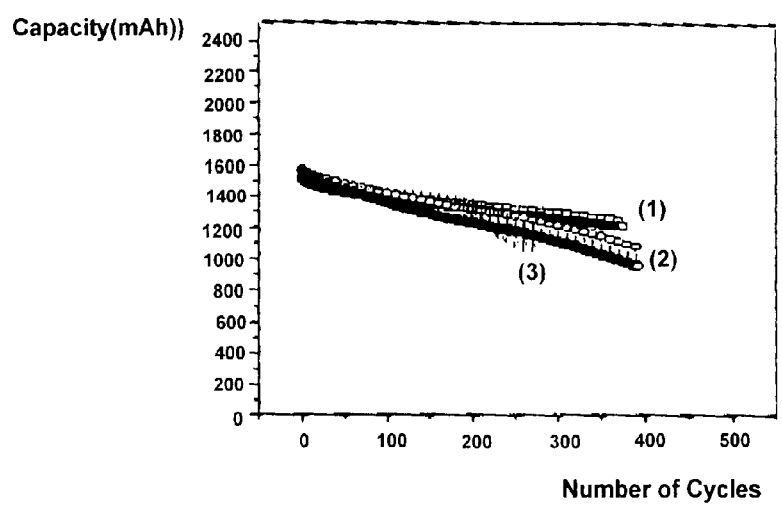
FIG. 4 is a graph showing cycle life characteristics at a high temperature of batteries using conventional electrolyte and an electrolyte of the present invention.
Figure 5:
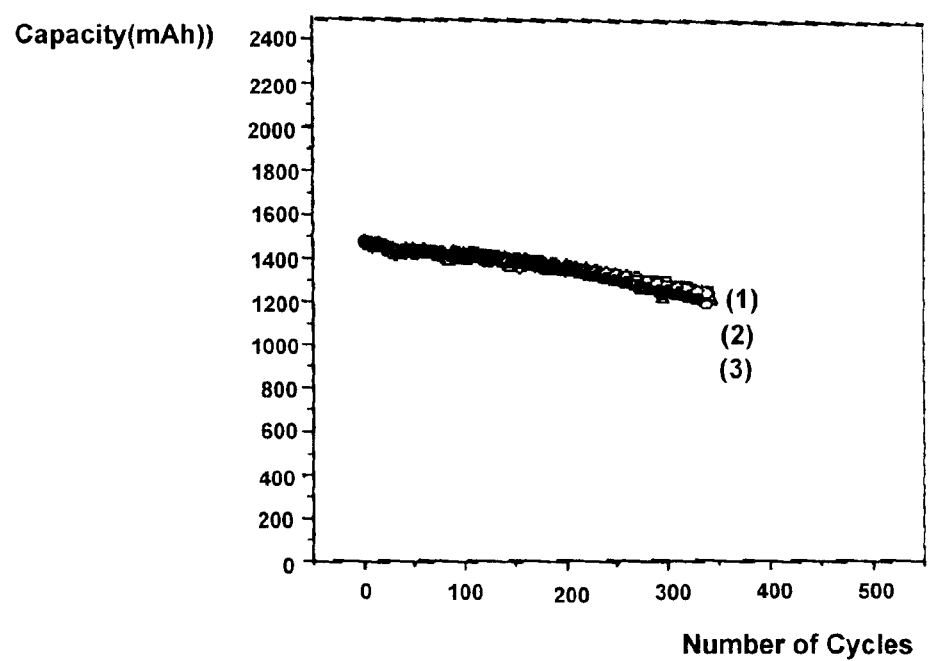
FIG. 5 is a graph showing cycle life characteristics at room temperature of batteries using an electrolyte of the present invention.

As shown in Table 1 and FIGS. 4 and 5, the cells of Examples 1–5 have good cycle life characteristics at room and high temperature when compared with Comparative examples 1–4. FIG. 5 shows cycle life characteristics at room temperature (25° C.) of the cells according to Examples 1–3. In FIG. 5, line 1 refers to Example 2, line 2 refers to Example 1 and line 3 refers to Example 3. FIG. 4 shows cycle life characteristics at a high temperature of 50° C. of Examples 1 and 5, and Comparative example 1. In FIG. 4, line 1 refers to Example 1, line 2 refers to Example 5 and line 3 refers to Comparative example 1.

Figure 6:
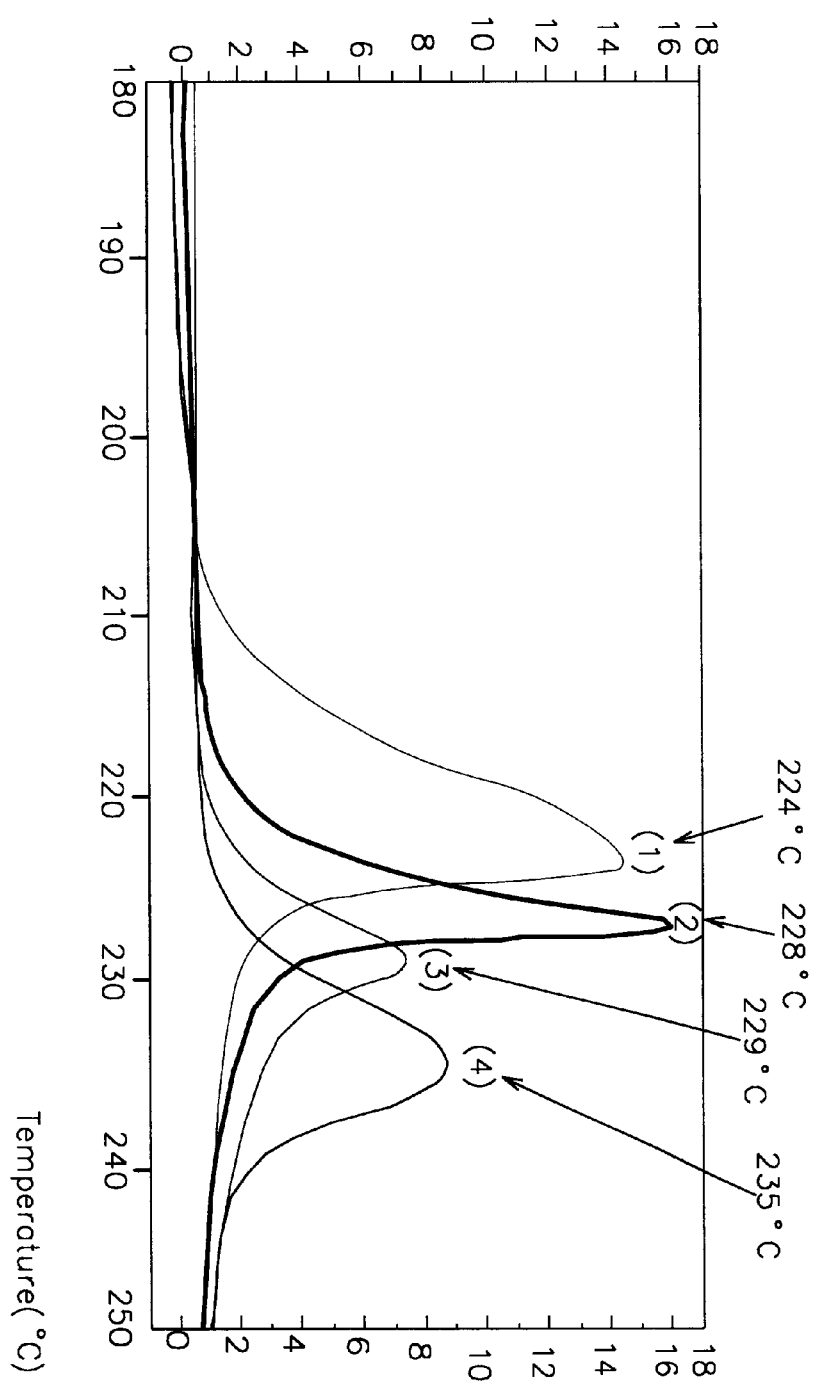
FIG. 6 is a differential scanning calorimeter graph of positive electrodes made of $LiNi_{0.8}Co_{0.2}O_2$ into which conventional electrolyte and the electrolyte of the present invention are immersed, respectively.
Figure 7:
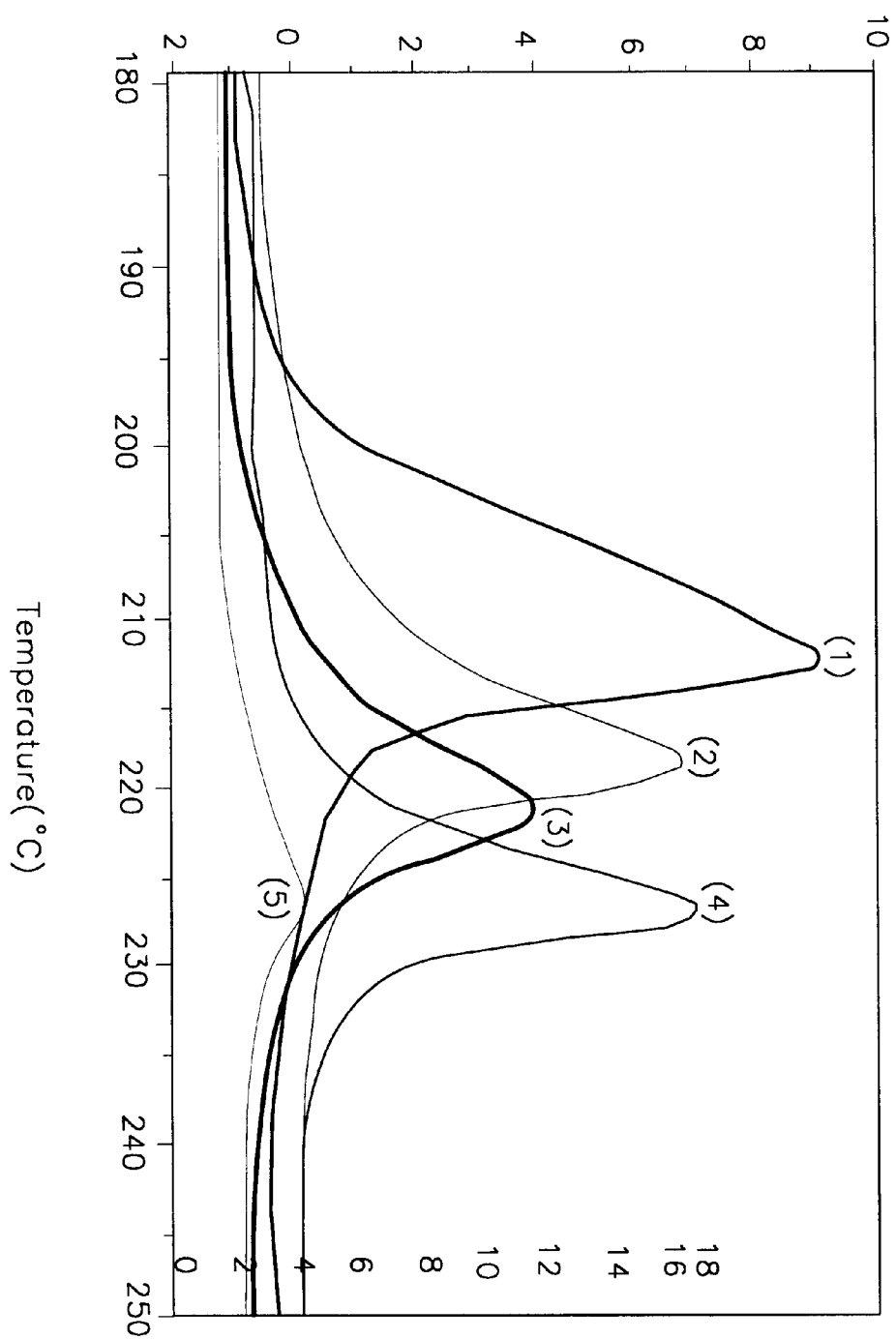
FIG. 7 is a differential scanning calorimeter graph of positive electrodes made of $LiNi_{0.8}Co_{0.15}Al_{0.05}O_2$ into which conventional electrolyte and the electrolyte of the present invention are immersed, respectively.

As shown in Table 1, the cells of Examples 1–5 with alkyl acetate have high thermal decomposition temperatures and low quantity of heat evolved compared with the cells without alkyl acetate, although thermal decomposition temperature and low quantity of heat evolved depend on the active material. FIG. 6 shows differential scanning calorimeter graph of the cells according to Examples 1 and 4, and Comparative examples 1 and 3. For the positive active material, LiNi$_{0.8}$Co$_{0.2}$O$_2$ manufactured by Fuji Co. was used in the cells. In FIG. 6, line 1 refers to Comparative example 1, line 2 refers to Comparative example 3, line 3 refers to Example 4 and line 4 refers to Example 1. FIG. 7 shows a differential scanning calorimeter graph of the cells according to Examples 1, 4 and 5, and Comparative examples 1 and 3. In FIG. 7, line 1 refers to Comparative example 3, line 2 refers to Example 4, line 3 refers to Example 5, line 4 refers to Comparative example 1 and line 5 refers to Example 1. As shown in Table 1, and FIGS. 6 and 7, the thermal decomposition temperature of the active material in Examples 1–5 increases by about a maximum of 10° C. and the quantity of heat evolved decreases by about a maximum of 90%, when compared with Comparative examples 1–4. This result is indicated that the acetate-based electrolyte, for example electrolyte including alkyl acetate, improves the safety of the battery.

The electrolyte including alkyl acetate of the present invention can be used in a rechargeable battery to have good low temperature characteristics and safety.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for rechargeable lithium battery consisting essentially of:
   a non-aqueous organic solvent including 20 to 70 volume % of cyclic carbonate, 20 to 70 volume % of chain carbonate, and 40 to 60 volume % of alkyl acetate; and
   a lithium salt.

2. The electrolyte of claim 1 wherein the cyclic carbonate is selected from the group consisting of ethylene carbonate, propylene carbonate and a mixture thereof, the chain carbonate is selected from the group consisting of dimethyl carbonate, diethyl carbonate, methyl ethyl carbonate, methyl propyl carbonate and a mixture thereof and the alkyl acetate is selected from the group consisting of n-methyl acetate, n-ethyl acetate, n-propyl acetate and a mixture thereof.

3. The electrolyte of claim 1 wherein the lithium salt is selected from the group consisting of lithium hexafluorophosphate ($LiPF_6$), lithium tetrafluoroborate ($LiBF_4$), lithium perchlorate ($LiClO_4$), lithium trifluoromethanesulfonate ($LiCF_3SO_3$) and a mixture thereof.

4. A rechargeable lithium battery comprising:
   a positive electrode including a transition metal oxide-based active material
   a negative electrode including a carbon-based active material;
   a separator interposed between the positive and negative electrodes; and
   an electrolyte into which the positive and negative electrodes and the separator are immersed, the electrolyte consisting essentially of 20 to 70 % of cyclic carbonate, 20 to 70 volume % of chain carbonate, and 40 to 60 volume % of alkyl acetate, and a lithium salt.

5. The rechargeable lithium battery of claim 4 wherein the carbon-based active material is globular material or graphite fiber, the globular material being prepared by carbonizing mesophase globular particles and graphitizing the carbonized mesophase globular particles, and the graphite fiber being prepared by carbonizing mesophase pitch fiber and graphitizing the carbonized mesophase pitch fiber, and wherein the carbon-based active material has a planar distance of $d_{002}$ of 3.35 to 3.38Å of an X-ray diffraction plane distance at a (002) plane, a crystallinity size in a direction of a c axis of Lc of 20 nm and exothermic peaks of at least 700° C. in a differential thermal analysis.

* * * * *